United States Patent
Bergman et al.

(10) Patent No.: US 7,702,757 B2
(45) Date of Patent: Apr. 20, 2010

(54) METHOD, APPARATUS AND PROGRAM STORAGE DEVICE FOR PROVIDING CONTROL TO A NETWORKED STORAGE ARCHITECTURE

(75) Inventors: Lyle Bergman, Cottage Grove, MN (US); Dave Ebsen, Chaska, MN (US); Randal S. Rysavy, Kasson, MN (US); Timothy W. Swatosh, Rochester, MN (US); Jeffrey L. Williams, Rochester, MN (US)

(73) Assignee: Xiotech Corporation, Eden Prairie, MN (US)

( * ) Notice: Subject to any disclaimer, the term of this patent is extended or adjusted under 35 U.S.C. 154(b) by 1407 days.

(21) Appl. No.: 10/819,695

(22) Filed: Apr. 7, 2004

(65) Prior Publication Data

US 2005/0234916 A1    Oct. 20, 2005

(51) Int. Cl.
G06F 15/177    (2006.01)

(52) U.S. Cl. .................. 709/220; 709/213; 709/214; 709/223; 711/111

(58) Field of Classification Search .......... 709/220, 709/224, 211, 213–214, 217–219, 223; 711/111
See application file for complete search history.

(56) References Cited

U.S. PATENT DOCUMENTS

| | | | |
|---|---|---|---|
| 5,276,877 A | 1/1994 | Friedrich et al. | |
| 5,465,337 A | 11/1995 | Kong | |
| 5,768,623 A * | 6/1998 | Judd et al. .................. 711/114 |
| 6,061,709 A | 5/2000 | Bronte | |
| 6,157,963 A * | 12/2000 | Courtright et al. .............. 710/5 |
| 6,219,753 B1 | 4/2001 | Richardson | |
| 6,571,355 B1 | 5/2003 | Linnell | |
| 6,578,158 B1 | 6/2003 | Deitz et al. | |
| 6,601,187 B1 | 7/2003 | Sicola et al. | |
| 6,671,776 B1 * | 12/2003 | DeKoning .................. 711/114 |
| 6,732,117 B1 * | 5/2004 | Chilton ...................... 709/223 |
| 6,745,207 B2 | 6/2004 | Reuter et al. | |
| 6,775,230 B1 | 8/2004 | Watanabe | |
| 6,892,203 B2 * | 5/2005 | Kasako et al. ............... 709/223 |
| 6,944,133 B2 * | 9/2005 | Wisner et al. ............... 709/217 |
| 6,952,734 B1 | 10/2005 | Gunlock et al. | |
| 7,010,528 B2 * | 3/2006 | Curran et al. ................. 707/10 |
| 7,159,094 B1 | 1/2007 | Cholleti et al. | |
| 7,216,148 B2 * | 5/2007 | Matsunami et al. ......... 709/208 |
| 7,269,646 B2 * | 9/2007 | Yamamoto et al. .......... 709/223 |

(Continued)

FOREIGN PATENT DOCUMENTS

EP    706130 A1    4/1996

OTHER PUBLICATIONS

"Disk Thrashing" Jul. 3, 2003. Retrieved from http://www.webopedia.com/TERM/d/disk_trashing.htm.

(Continued)

*Primary Examiner*—Philip B Tran
(74) *Attorney, Agent, or Firm*—Beck & Tysver PLLC

(57) ABSTRACT

A method, apparatus and program storage device for providing control to a networked storage architecture is disclosed. A networked storage device is provided. Controllers are coupled to the at least one networked storage device for controlling input/output operations of the networked storage device. The networked storage device includes a file system for storing data provided by a first of the controllers for retrieval by the other controllers.

51 Claims, 7 Drawing Sheets

U.S. PATENT DOCUMENTS

| | | | |
|---|---|---|---|
| 2003/0046606 A1 | 3/2003 | Johnson et al. | |
| 2003/0126315 A1 | 7/2003 | Tan et al. | |
| 2004/0148380 A1* | 7/2004 | Meyer et al. | 709/223 |
| 2004/0153863 A1 | 8/2004 | Klotz et al. | |
| 2005/0071837 A1 | 3/2005 | Butt et al. | |
| 2006/0072459 A1 | 4/2006 | Knight et al. | |
| 2006/0146698 A1 | 7/2006 | Ukrainetz et al. | |
| 2006/0149913 A1 | 7/2006 | Rothman et al. | |
| 2006/0174000 A1 | 8/2006 | Graves | |
| 2006/0236059 A1 | 10/2006 | Fleming et al. | |
| 2006/0242363 A1 | 10/2006 | Tamura et al. | |
| 2007/0005820 A1 | 1/2007 | Banzhaf et al. | |

OTHER PUBLICATIONS

Sicola, Steve. 'SCSI-3 Fault Tolerant Controller Configuraitons utilizing SCC & New Event Codes,' High Availability Study Group, Document No. X3T10 95-312r3, Rev 3.0, Feb. 1996, pp. 1-14.

http://en.wikipedia.org/wiki/Storage_Area_Network, 2009.
Office Action, mailed May 2, 2004, U.S. Appl. No. 10/183,979.
Office Action, mailed Jan. 21, 2005, U.S. Appl. No. 10/183,967.
Office Action, mailed Feb. 4, 2005, U.S. Appl. No. 10/183,950.
Office Action, mailed Feb. 10, 2005, U.S. Appl. No. 10/183,946.
Office Action, mailed Mar. 14, 2005, U.S. Appl. No. 10/183,947.
Office Action, mailed Jun. 27, 2005, U.S. Appl. No. 10/184,059.
Office Action, mailed Jul. 1, 2005, U.S. Appl. No. 10/184,058.
Office Action, mailed Sep. 16, 2005, U.S. Appl. No. 10/183,950.
Office Action, mailed Aug. 26, 2005, U.S. Appl. No. 10/430,487.
Office Action, mailed Sep. 8, 2005, U.S. Appl. No. 10/183,949.
Office Action, mailed Sep. 12, 2005, U.S. Appl. No. 10/183,947.
Office Action, mailed Mar. 2, 2006, U.S. Appl. No. 10/434,489.
Office Action, mailed Nov. 20, 2006, U.S. Appl. No. 10/434,489.
Office Action, mailed Jul. 30, 2009, U.S. Appl. No. 11/731,496.

* cited by examiner

METHOD, APPARATUS AND PROGRAM STORAGE DEVICE FOR PROVIDING CONTROL TO A NETWORKED STORAGE ARCHITECTURE

BACKGROUND OF THE INVENTION

1. Field of the Invention

This invention relates in general to computer storage systems, and more particularly to a method, apparatus and program storage device for providing control to a networked storage architecture.

2. Description of Related Art

Distributed computing systems, such as clusters, may include two or more nodes, which may be employed to perform a computing task. Generally speaking, a node is a group of circuitry designed to perform one or more computing tasks. A node may include one or more processors, a memory and interface circuitry. Generally speaking, a cluster is a group of two or more nodes that have the capability of exchanging data between nodes. A particular computing task may be performed upon one node while other nodes perform unrelated computing tasks. Alternatively, components of a particular computing task may be distributed among the nodes to decrease the time required to perform the computing task as a whole. Generally speaking, a processor is a device configured to perform an operation upon one more operands to produce a result. The operations may be performed in response to instructions executed by the processor.

Clustering is a popular strategy for implementing parallel processing applications because it allows system administrators to leverage already existing servers, computers and workstations. Clustering is also useful for load balancing to distribute processing and communications activity evenly across a network system so that no single server is overwhelmed. For example, if one server is running the risk of being swamped, requests may be forwarded to another clustered server with greater capacity. Clustering also provides for increased scalability by allowing new components to be added as the system load increases. In addition, clustering simplifies the management of groups of systems and their applications by allowing the system administrator to manage an entire group as a single system. Clustering may also be used to increase the fault tolerance of a network system. For example, if one server suffers an unexpected software or hardware failure, another clustered server may assume the operations of the failed server.

Clustering may be implemented in computer networks utilizing storage area networks (SAN) and similar networking environments. SAN networks allow storage systems to be shared among multiple clusters and/or servers. Nodes within a cluster may have one or more storage devices coupled to the nodes. Generally speaking, a storage device is a persistent device capable of storing large amounts of data. For example, a storage device may be a magnetic storage device such as a disk device or optical storage device such as a compact disc device. Although a disk device is only one example of a storage device, the term "disk" may be used interchangeably with "storage device" throughout this specification. Nodes physically connected to a storage device may access the storage device directly. A storage device may be physically connected to one or more nodes of a cluster, but the storage device may not be physically connected to all the nodes of a cluster. The nodes that are not physically connected to a storage device may not access that storage device directly. In some clusters, a node not physically connected to a storage device may indirectly access the storage device via a data communication link connecting the nodes.

It may be advantageous to allow a node to access any storage device within a cluster as if the storage device is physically connected to the node. For example, some applications, such as the Oracle Parallel Server, may require all storage devices in a cluster to be accessed via normal storage device semantics, e.g., Unix device semantics. The storage devices that are not physically connected to a node but which appear to be physically connected to a node are called virtual devices or virtual disks. Generally speaking, a distributed virtual disk system is a software program operating on two or more nodes which provides an interface between a client and one or more storage devices and presents the appearance that the one or more storage devices are directly connected to the nodes. Generally speaking, a client is a program or subroutine that accesses a program to initiate an action. A client may be an application program or an operating system subroutine.

Unfortunately, conventional virtual disk systems do not guarantee a consistent virtual disk mapping. Generally speaking, a storage device mapping identifies to which nodes a storage device is physically connected and which disk device on those nodes corresponds to the storage device. The node and disk device that map a virtual device to a storage device may be referred to as a node/disk pair. The virtual device mapping may also contain permissions and other information. It is desirable that the mapping is persistent in the event of failures, such as a node failure. A node is physically connected to a device if it can communicate with the device without the assistance of other nodes.

A cluster may implement a volume manager. A volume manager is a tool for managing the storage resources of the cluster. For example, a volume manager may mirror two storage devices to create one highly available volume. In another embodiment, a volume manager may implement striping, which is storing portions of files across multiple storage devices. Conventional virtual disk systems cannot support a volume manager layered either above or below the storage devices.

Other desirable features include high availability of data access requests such that data access requests are reliably performed in the presence of failures, such as a node failure or a storage device path failure. Generally speaking, a storage device path is a direct connection from a node to a storage device. Generally speaking, a data access request is a request to a storage device to read or write data.

In a virtual disk system, multiple nodes may have representations of a storage device. Unfortunately, conventional systems do not provide a reliable means of ensuring that the representations on each node have consistent permission data. Generally speaking, permission data identify which users have permission to access devices, directories or files. Permissions may include read permission, write permission or execute permission.

Still further, it is desirable to have the capability of adding or removing nodes from a cluster or to change the connection of existing nodes to storage devices while the cluster is operating. This capability is particularly important in clusters used in critical applications in which the cluster cannot be brought down. This capability allows physical resources (such as nodes and storage devices) to be added to the system, or repair and replacement to be accomplished without compromising data access requests within the cluster.

It is also desirable to provide the ability for rapid recovery of user data from a disaster or significant error event at a data processing facility. This type of capability is often termed "disaster tolerance." In a data storage environment, disaster tolerance requirements include providing for replicated data and redundant storage to support recovery after the event. In order to provide a safe physical distance between the original data and the data to back up, the data must be migrated from one storage subsystem or physical site to another subsystem or site. It is also desirable for user applications to continue to run while data replication continues in the background. Data warehousing, continuous computing, and Enterprise Applications all require remote copy capabilities.

Storage controllers are commonly utilized in computer systems to off-load from the host computer certain lower level processing functions relating to I/O operations, and to serve as interface between the host computer and the physical storage media. Given the critical role played by the storage controller with respect to computer system I/O performance, it is desirable to minimize the potential for interrupted I/O service due to storage controller malfunction. Thus, prior workers in the art have developed various system design approaches in an attempt to achieve some degree of fault tolerance in the storage control function.

One prior method of providing storage system fault tolerance accomplishes failover through the use of two controllers coupled in an active/passive configuration. During failover, the passive controller takes over for the active (failing) controller. A drawback to this type of dual configuration is that it cannot support load balancing, as only one controller is active and thus utilized at any given time, to increase overall system performance. Furthermore, the passive controller presents an inefficient use of system resources.

Another approach to storage controller fault tolerance is based on a process called "failover." Failover is known in the art as a process by which a first storage controller coupled to a second controller assumes the responsibilities of the second controller when the second controller fails. "Failback" is the reverse operation, wherein the second controller, having been either repaired or replaced, recovers control over its originally attached storage devices. Since each controller is capable of accessing the storage devices attached to the other controller as a result of the failover, there is no need to store and maintain a duplicate copy of the data, i.e., one set stored on the first controller's attached devices and a second (redundant) copy on the second controller's devices.

However, in a multi-controller system with a shared configuration, a method to track configurations is required. The need to provide a consistent configuration and control mechanism across all controllers in the storage system is paramount in order to present a unified, functional storage system. In addition, a way to transfer these configurations between controllers is needed to maintain this consistency. In addition, one controller may be designated as a master to simplify control over the storage system. In such an arrangement, a way to provide remote control of multiple controllers from one controller is needed.

It can be seen then that there is a need for a method, apparatus and program storage device for providing control to a networked storage architecture.

SUMMARY OF THE INVENTION

To overcome the limitations in the prior art described above, and to overcome other limitations that will become apparent upon reading and understanding the present specification, the present invention discloses a method, apparatus and program storage device for providing control to a networked storage architecture.

The present invention solves the above-described problems by providing a method to track shared configuration data. The present invention also provides a way to transfer data including configuration data to each controller. A file system is provided to control multiple controllers from one controller remotely, via synchronous bi-directional communications over a network. The file system is stored in a commonly accessible networked storage device. A heartbeat file may be used to indicate whether a particular slave controller is alive.

A system in accordance with the principles of the present invention includes at least one networked storage device and a plurality of controllers, coupled to the at least one networked storage device, for controlling input/output operations of the at least one networked storage device, wherein the at least one networked storage device includes a file system for storing data provided by a first of the plurality of controllers for retrieval by at least a second controller.

In another embodiment of the present invention, a method for providing control to a networked storage architecture is provided. The method includes generating data at a first controller, writing the data to at least one networked storage device, retrieving the data by at least a second controller and processing the retrieved data at the at least second controller.

In another embodiment of the present invention, another storage system is provided. This storage system includes means for providing networked storage and means for controlling the means for providing networked storage, wherein the means for providing networked storage includes means for storing files provided by the means for controlling the means for providing network storage for retrieval by the means for controlling the means for providing network storage.

In another embodiment of the present invention, a program storage device readable by a computer is provided. The program storage device tangibly embodies one or more programs of instructions executable by the computer to perform a method for providing control to a networked storage architecture, wherein the method includes generating data at a first controller, writing the data to at least one networked storage device, retrieving the data by at least a second controller and processing the retrieved data at the at least second controller.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for providing control to a networked storage architecture. The present invention provides a method to track shared configuration data. The present invention also provides a way to transfer data including configuration data to each controller. A file system is provided to control multiple controllers from one controller remotely, via synchronous bi-directional communications over a network. The file system is stored in a commonly accessible networked storage device. A heartbeat file may be used to indicate whether a particular slave controller is alive.

Figure 1:
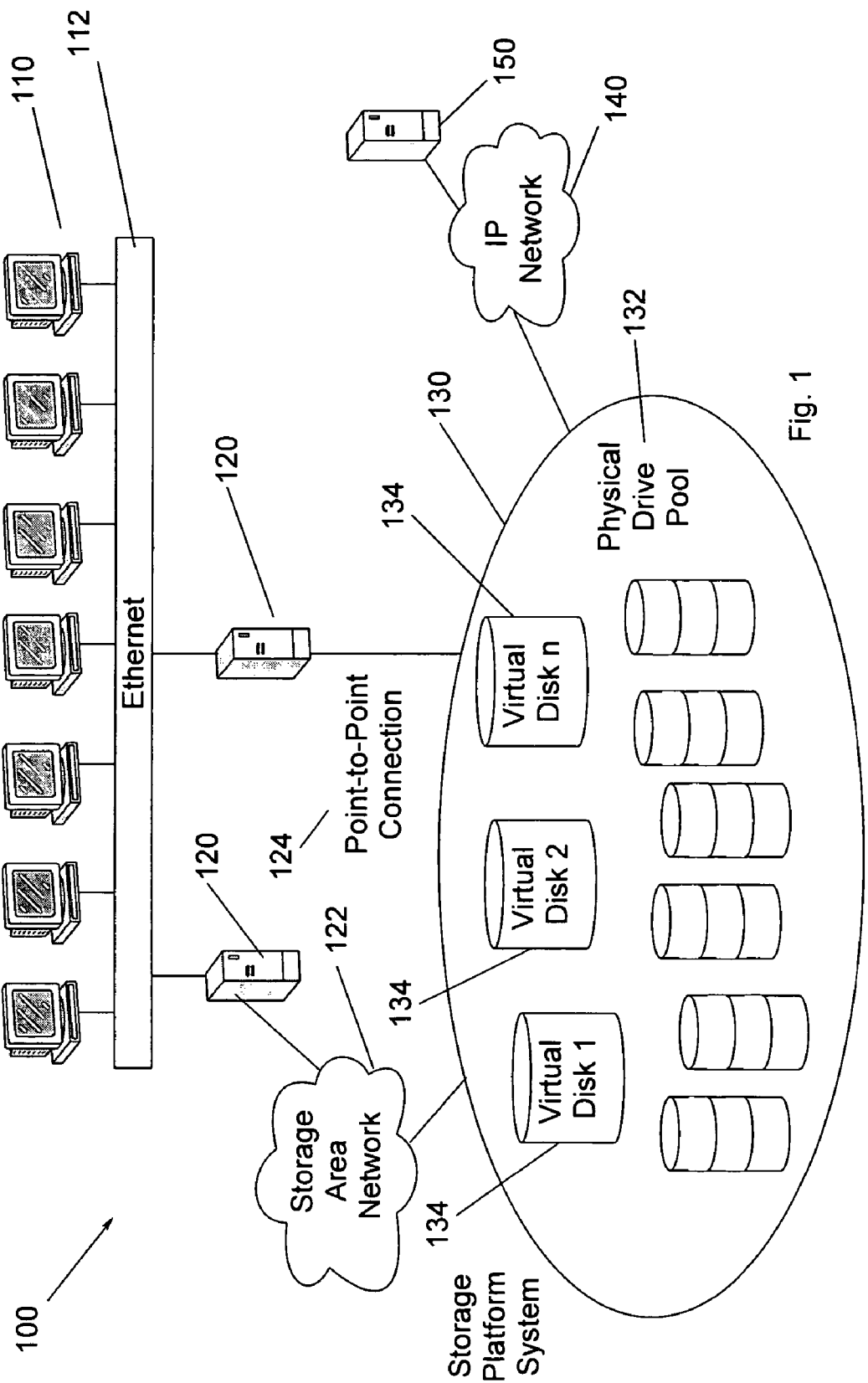
FIG. 1 illustrates a storage system according to an embodiment of the present invention.

FIG. 1 illustrates a storage system 100 according to an embodiment of the present invention. In FIG. 1, multiple users 110 are coupled to a network 112. For example, Ethernet is one type of network 112. Ethernet is generally placed at the data link layer of the Open System Interconnect (OSI) 7-layer model, second from the bottom, but it also includes elements of the physical layer.

An access node 120 is coupled to a storage platform system 130. The access node 120 may be a server that is accessed by the users via Ethernet, for example, as discussed above, a gateway device, etc. The access node 120 may be coupled to the storage platform system 130 via a storage area network 122, a point-to-point connection 124, etc.

Figure 2:
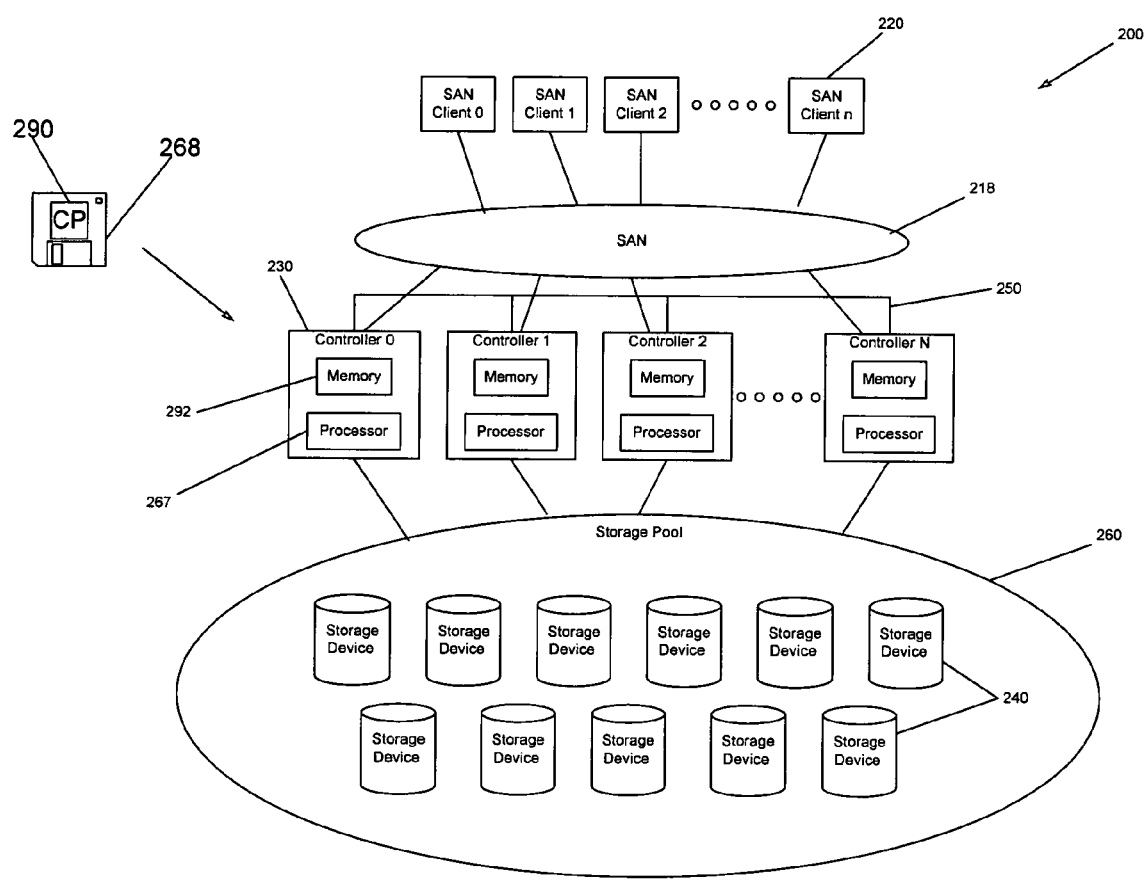
FIG. 2 is a simplified block diagram showing the configuration of a distributed network computer storage system according to an embodiment of the present invention.

To the user 110, the storage platform system 130 appears as virtual storage device 134. The virtual storage device 134 may include a pool of storage disks 132 that are managed by a management module as shown in FIG. 2. One function of the management module is to represent information on the disks 132 to the user as at least one virtual disk 134, such as virtual disk volume.

The management module is connected to the array of disks 132 to control the allocation of data on the physical disks 132. The information on the array 132 is presented to the computer systems of the users 110 as one or more virtual disks 134 and information in the virtual disks 134 is mapped to the array 132. The storage platform system 130 may be expanded via a network connection 140, e.g., IP Network, to a remote storage platform system 150.

FIG. 2 is a simplified block diagram showing the configuration of a distributed network computer storage system 200 according to an embodiment of the present invention. In this embodiment of the invention, storage system 200 is connected by way of a fibre channel Storage Area Network (SAN) 218 to a plurality of SAN clients 220. Each SAN client 220 is a computer such as generally called a personal computer or server computer and accesses the storage system 200 through a block I/O interface. The storage system 200 includes a plurality of disk array controllers 230 and a plurality of storage devices 240. The disk array controllers 230 may be coupled to communicate with each other via a management network 250. The disk array controllers 230 are also connected to the storage devices 240 of the storage pool 260. The disk array controllers 230 may be connected through a fibre channel.

Figure 3:
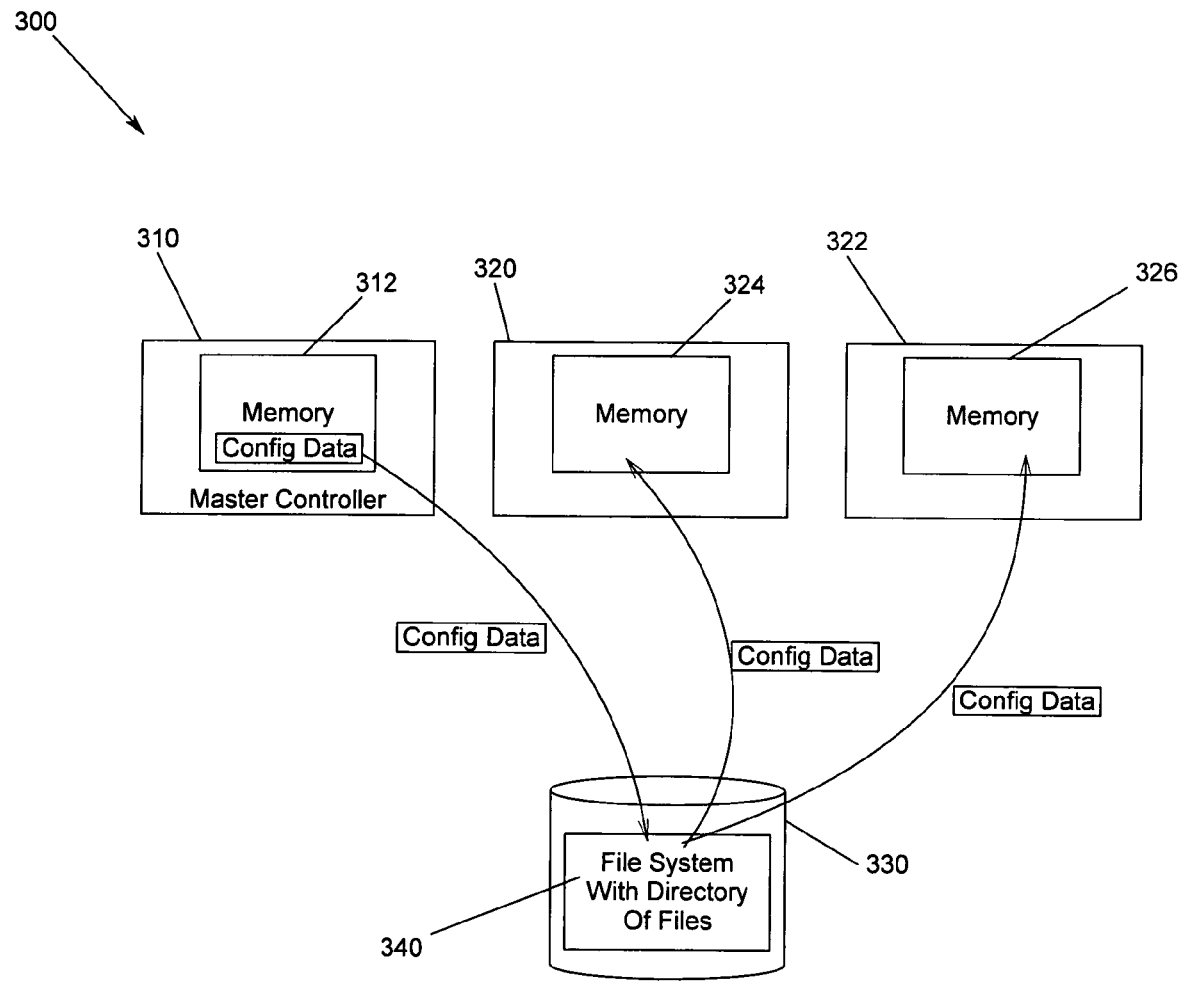
FIG. 3 illustrates a simplified view of controllers and storage devices according to an embodiment of the present invention.

FIG. 3 illustrates a simplified view 300 of controllers and storage devices according to an embodiment of the present invention. In FIG. 3, a master controller 310 and slave controllers 320, 322 are shown. Each of the controllers 310, 320, 322 includes memory 312, 324, 326. For example, the memory 312, 324, 326 may include non-volatile random access memory. Each of the controllers 310, 320, 322 may access storage 330. Storage 330 includes a file system 340.

To maintain configuration consistency, configuration is written to memory 312 on the master controller 310 and provided to the file system 340. Each of the remaining controllers 320, 322 may access the configuration data from the file system 340 on at least one shared storage device 330. All controllers 310, 320, 322 are then able to share a single configuration. Any of the slave controllers 320, 322 may read the configuration from the storage device 330 and load the configuration data into their memory 324, 326 and use it. Any configuration changes are also performed by a master controller 310, saved to the memory 312 of the master controller 310 and written to the storage device 330 for access by any of the slave controllers 320, 322.

Figure 4:
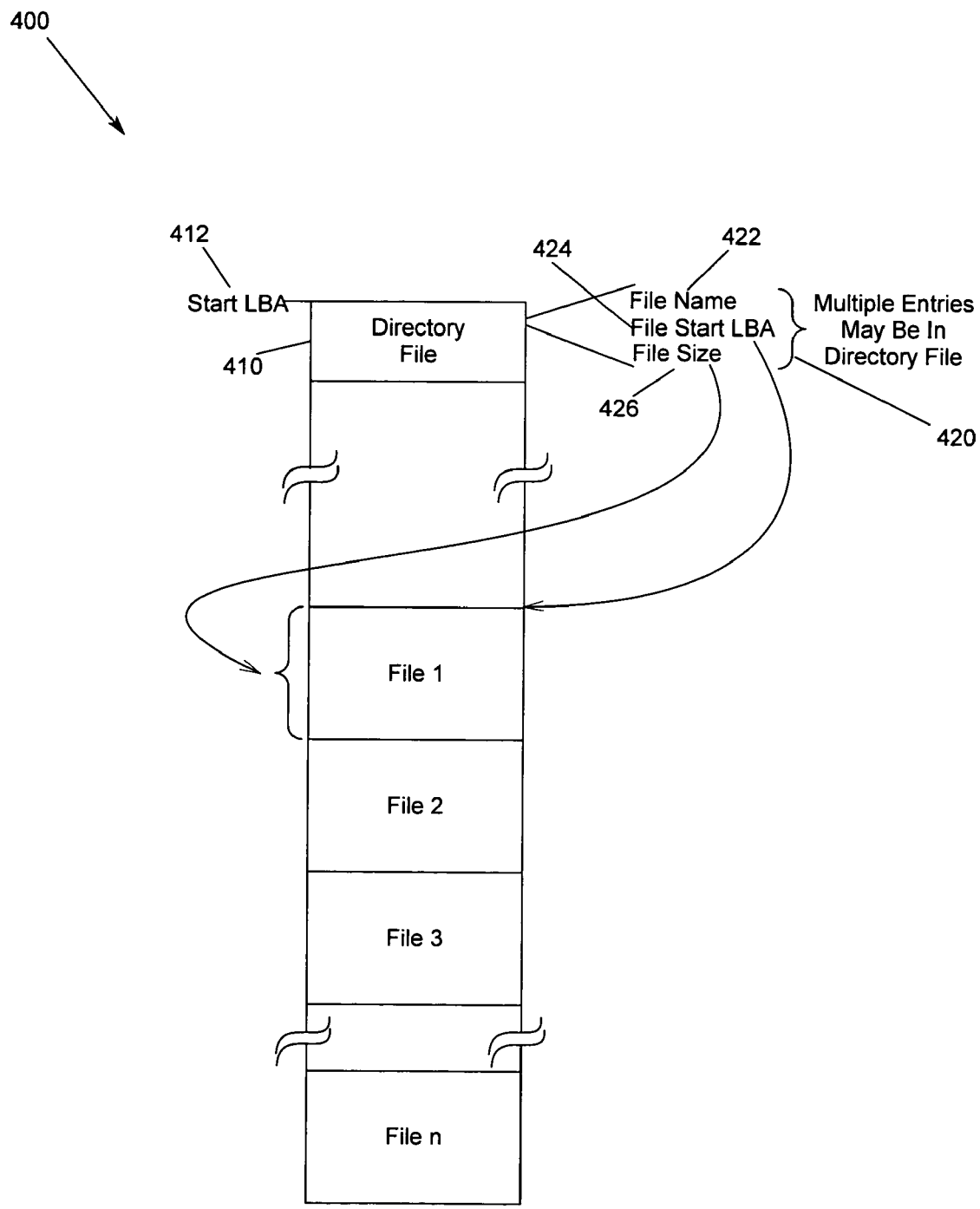
FIG. 4 illustrates a file system for sharing data between controllers according to an embodiment of the present invention.

FIG. 4 illustrates a file system 400 for sharing data between controllers according to an embodiment of the present invention. In FIG. 4, a file system 400 for a storage device in a shared pool is shown. This file system 400 may be replicated on each storage device in the shared storage device pool. The file system 400 provides a way to communicate various data from one controller to another in a shared storage device pool. The file system 400 may include a directory file 410, which contains the list of files in the file system 400. The directory file 410 is used to locate files on the file system 400. The file system 400 is expandable and may be replicated on multiple devices to provide redundancy. The file system 400 has a starting logical block address (LBA) 412. The directory file 410 includes an entry 420 for each file name. Each entry includes the file name 422, file start LBA 424 and the file size 426.

Figure 5:
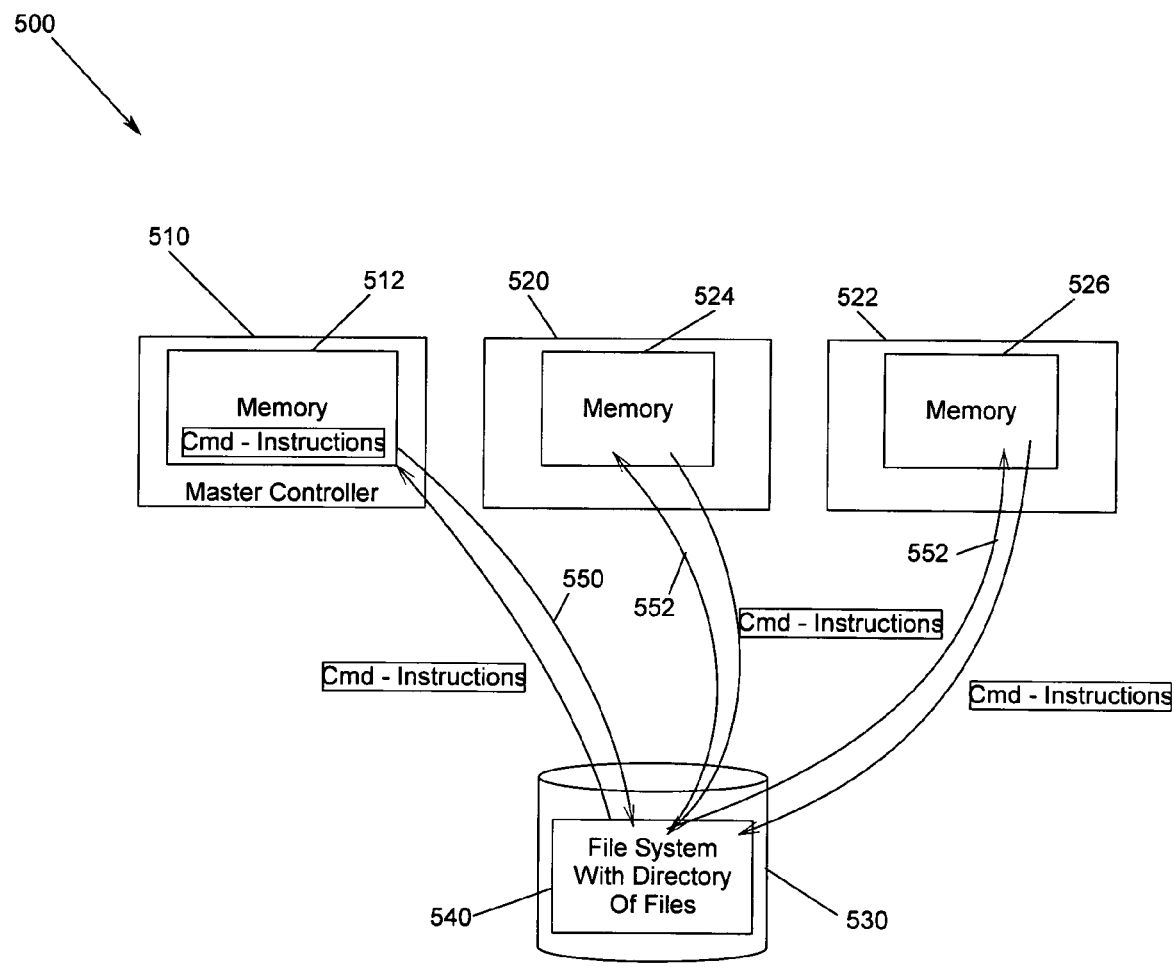
FIG. 5 illustrates the control of multiple computers from one computer remotely, via synchronous bi-directional communications over a network using a commonly accessible networked storage device, and dedicated input/output and heartbeat files according to an embodiment of the present invention.

FIG. 5 is a block diagram 500 illustrating the control of multiple controllers from one controller remotely, via synchronous bi-directional communications over a network using a commonly accessible networked storage device, and dedicated input/output and heartbeat files according to an embodiment of the present invention. Data, such as configuration data, commands, instructions, heartbeat files, may be provided in the file system 540 so that any controller 510, 520, 522 may access the data from the network storage device 530. Thus, multiple controllers 510, 520, 522 may exchange commands or instructions. For example, such data may include instructions that may provide programs to be executed or system-level functions to be performed.

A master controller 510 may write 550 a command or instruction to a specific file in the file system 540 for each slave controller 520, 522 on a commonly accessible network storage device 530. Each of the controllers 510, 520, 522 includes memory 512, 524, 526. Slave controllers 520, 522 receiving a command or instruction are set up to periodically read 552 their specific files on a network storage device 530 to retrieve any command or instruction and then execute any retrieved instructions. The slave controllers 520, 522 must interpret the instruction and execute the instructions accordingly.

The master controller 510 needs to obtain feedback from the controllers 520, 522 it is controlling. The slave controllers 520, 522 write to their own dedicated files in the file system 540 on the network storage device 530 where the master controller 510 can then read them. Each slave controller 520, 522 has its own dedicated file in the file system 540.

File sharing between the controllers would add a layer of complexity and create its own set of problems, potentially making control risky. However, the method of control according to an embodiment of the present invention does not use file sharing. Each file in the file system 540 is input only or output only. For example, the master controller 510 will only write to the file that the master controller 510 uses to provide instructions for a particular slave 520, 522 to execute. This slave 520, 522 will read from this file. Timing the reads and writes generally prevents both operations from happening at the same time, although such an occurrence wouldn't create any file problems. More than one controller cannot write to the same file at the same time.

Accordingly, the present invention only requires a master program running on a master controller 510, a program for each slave controller 520, 522 and a network storage device 530 accessible by all controllers 510, 520, 522. In addition, the setup for the master 510 and slave 520, 522 controllers is extremely easy, requiring only two pieces of information: giving a unique controller name for each slave 520, 522 and the full network path to the commonly accessible storage device 530. Moreover, there are no special protocols to load other than that needed for basic network communications because all communications are basic file operations.

Figure 6:
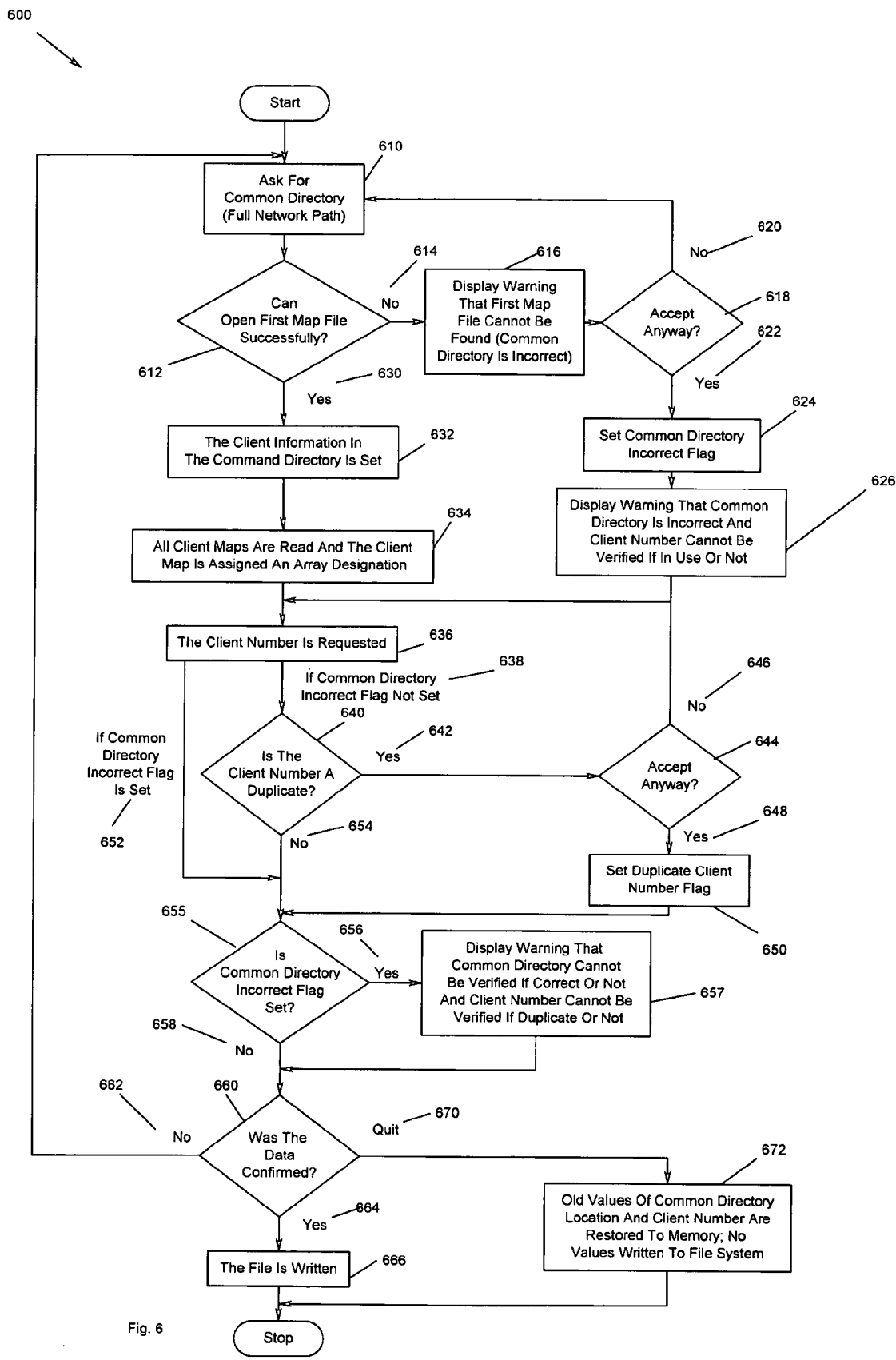
FIG. 6 illustrates a flow chart for building client information according to an embodiment of the present invention.

FIG. 6 illustrates a flow chart 600 for building client information according to an embodiment of the present invention. In FIG. 6, a common directory is requested for opening a client map 610. A determination is made whether the client map is opened successfully 612. If no 614, a warning is generated 616 and a determination is made whether the map is to be used anyway 618. If not 620, the system returns to the beginning 610. If yes 622, an indication that the client map exists is set 624. A warning may be generated 626. Then, the client number is requested 636.

If the client map is opened successfully 630, the client information in the command directory is set 632. All client maps are read and the client map is assigned an array designation 634. The client number is then requested 636.

After the client number is requested, either the client data was found or not. If the client data was found 638, a determination is made whether the map is a duplicate 640. If yes 642, a decision is made whether to accept it anyway 644. If no 646, the system loops back to ask for a client number again 636. If yes 648, the duplicate number is set to 1 650. If the client data was not found 652, if the client data is not a duplicate 654, or after the duplicate number is set to 1 650, a decision is made whether the common directory incorrect flag is set 655. If yes 656, a warning is displayed that the common directory cannot be verified as being correct and the client number cannot be verified as being a duplicate 657. If no 658, a decision is made whether the data is confirmed 660. If no 662, the system loops back to begin again 610. If yes 664, the file is written 666. The user may also decide to quit 670, in which case the old values of the client number are reset and logged in to the common directory 672.

Figure 7:
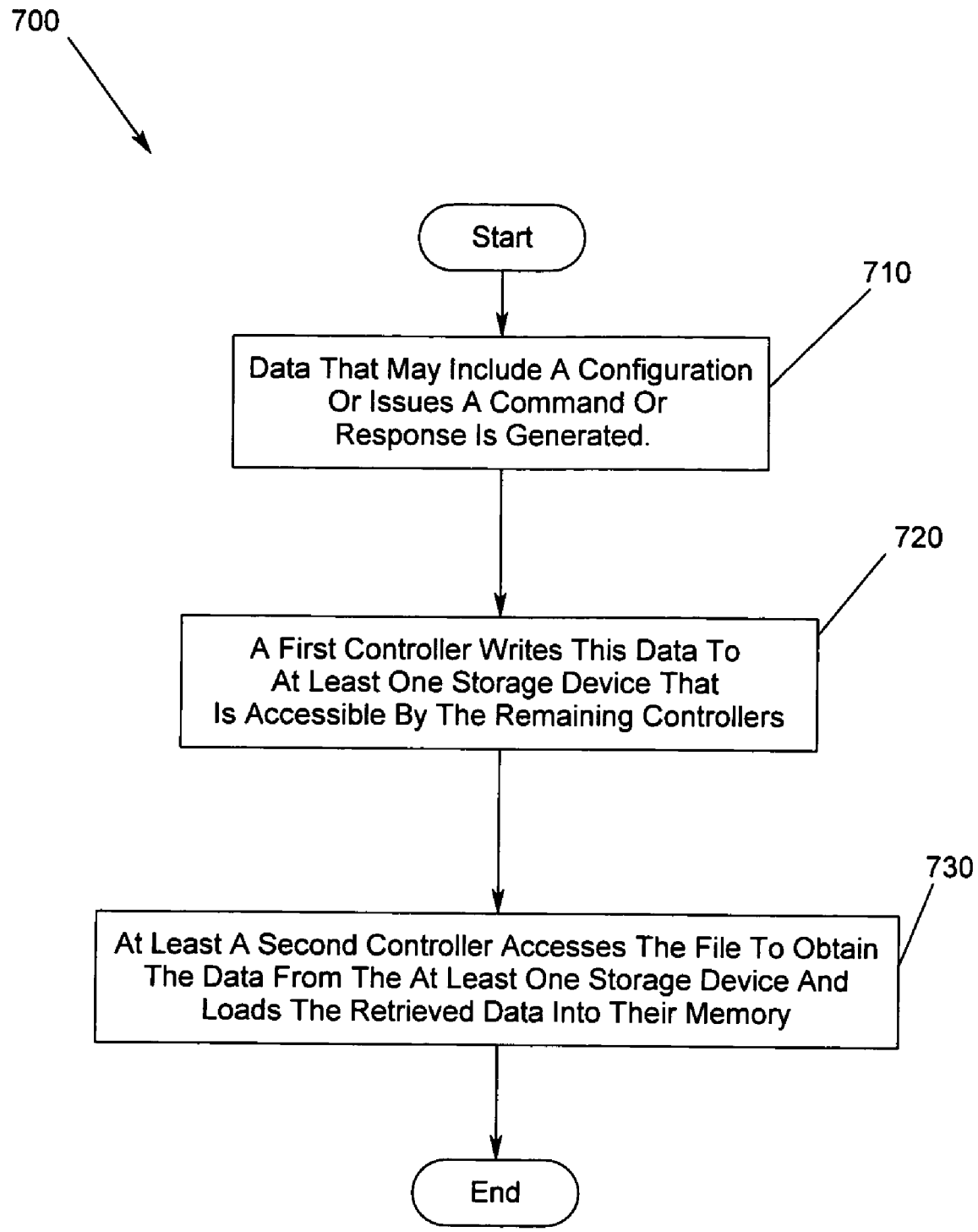
FIG. 7 is a flow chart of the method for communicating between controllers according to an embodiment of the present invention.

FIG. 7 is a flow chart 700 of the method for communicating between controllers according to an embodiment of the present invention. Data that may include a configuration file, a command or a response is generated 710. A first controller writes this data to at least one storage device that is accessible by the remaining controllers 720. The first controller may also write the data into its memory. At least a second controller accesses the file to obtain the data for processing 730.

Referring to FIG. 2, the method for providing control to a networked storage architecture according to embodiments of the present invention, which is described in detail with reference to FIGS. 3-7, may be tangibly embodied in a computer-readable medium or carrier, e.g. one or more of the fixed and/or removable data storage devices 268 illustrated in FIG. 2, or other data storage or data communications device. The computer program 290 may be loaded into the memory 292 to configure the processor 267 of FIG. 2, for execution. The computer program 290 comprise instructions which, when read and executed by the processor 267 of FIG. 2, causes a controller 230 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A storage system, comprising:
   a data storage device;
   a plurality of controllers, each controller having access to data on the data storage device and being adapted to controlling input/output operations of the data storage device;
   a networked configuration storage device commonly accessible to each controller the configuration storage device including a file system;
   a first controller, in the plurality of controllers, which writes information that relates to control of the data storage device to the file system; and
   a set, consisting of the remaining controllers, the controllers in the set reading the information written by the first controller, and processing the information.

2. The storage system of claim 1, wherein the information comprises a configuration file, the set of controllers being configured by the configuration file to provide a shared configuration among the plurality of controllers.

3. The storage system of claim 2, wherein the set of controllers periodically check the configuration file on the networked configuration storage device for configuration updates.

4. The storage system of claim 1, wherein the information comprises a command, the set of controllers each loading the command from the networked configuration storage device and processing the command.

5. The storage system of claim 1, wherein the information comprises an instruction, the set of controllers each loading the instruction from the networked configuration storage device and performing the retrieved instruction.

6. The storage system of claim 1, wherein the file system includes a directory file for locating files in the file system.

7. The storage system of claim 6, wherein the file system includes a respective heartbeat file corresponding to each controller in the set, the respective heartbeat file being updated by the corresponding controller periodically, thereby allowing the first controller to periodically check the respective heartbeat files on the file system to determine if the corresponding controllers are functioning.

8. The storage system of claim 1, wherein the file system includes a respective heartbeat file corresponding to each controller in the set, the respective heartbeat file being updated by the corresponding controller periodically, thereby allowing the first controller to periodically check the respective heartbeat files on the file system to determine if the corresponding controllers are functioning.

9. The storage system of claim 1, wherein the plurality of controllers include a memory for locally storing the data therein.

10. The storage system of claim 1, wherein the file system includes a directory file that includes an entry for each file in the file system, each entry including a file name, a start address and a file size indicator.

11. The storage system of claim 1, wherein the file system is expandable to allow any number of files in the file system.

12. The storage system of claim 1, wherein the file system includes a file for each of the plurality of controllers, each controller accessing its file to determine whether information has been added to the file.

13. The storage system of claim 12, wherein the information includes a configuration file, a command, a request, or an instruction.

14. The storage system of claim 1, wherein the first controller is a master controller and the set of controllers are slave controllers.

15. The storage system of claim 1, wherein the networked configuration storage device is a physical storage device.

16. The storage system of claim 1, wherein the set contains at least two controllers.

17. The storage system of claim 1, wherein a controller in the set writes information that relates to control of the data storage device to the file system; and another controller in the plurality of controllers reads that information and processes that information.

18. A method for providing control to a networked storage architecture, comprising:
   generating information, relating to control of a data storage device, at a first controller;
   writing the information to a networked configuration storage device that is commonly accessible by the first controller and a set of at least one other controller;
   retrieving the information by each controller in the set; and
   processing the retrieved information by each controller in the set, wherein the first controller and each controller in the set has access to data on the data storage device and is adapted to controlling input/output operations of the data storage device.

19. The method of claim 18, wherein the generating information comprises generating a configuration file for providing a shared configuration among the controllers.

20. The method of claim 19 further comprising periodically checking the networked configuration file by the set of controllers for configuration updates.

21. The method of claim 18, wherein the generating information comprises generating a command for processing by the set of controllers.

22. The method of claim 18, wherein the generating information comprises generating an instruction for performance by the set of controllers.

23. The method of claim 18, wherein the writing the information to a networked configuration storage device further includes writing the data to a file system for storing the data from the first controller.

24. The method of claim 23, wherein the writing the information to the file system further includes maintaining a directory file for locating files in the file system.

25. The method of claim 23, wherein the writing the information to the file system further includes providing by each controller in the set a respective heartbeat file that is updated periodically to allow the first controller to periodically verify whether each controller in the set is functioning.

26. The method of claim 18 further comprising writing the information into local memory of the controllers.

27. The method of claim 18, wherein the writing the information to a networked configuration storage device further includes writing the information to a file system and creating a directory file that includes an entry for each file in the file system.

28. The method of claim 27, wherein the creating a directory file includes providing a file name, a start address and a file size indicator for each entry in the directory file.

29. A program storage device readable by a computer, the program storage device tangibly embodying one or more programs of instructions executable by the computer to perform a method for providing control to a networked storage architecture, the method comprising:
   generating information, relating to control of a data storage device, at a first controller;
   writing the information to a networked configuration storage device that is commonly accessible by the first controller and a set of one or more other controllers;
   retrieving the information by the set of controllers; and
   processing the retrieved information by the set of controllers, wherein the first controller and each controller in the set has access to data on the data storage device and is adapted to controlling input/output operations of the data storage device.

30. A storage system, comprising:
   a) a data storage pool, including a first storage device and a second storage device;
   b) a management module, including a first controller and a set of one or more other controllers, the controllers in the management module being adapted to managing storage devices in the data storage pool;
   c) a management storage device, commonly accessible by the controllers in the management module and containing data storage pool management information represented in tangible media; and
   d) logic, tangibly embodied in instructions stored in digital media, whereby the first controller writes, to the management storage device, management information pertaining to the first storage device, and each controller in the set reads and processes the management information written by the first controller.

31. The storage system of claim 30, further comprising:
   e) an interface, adapted to providing a plurality of devices, which are external to the storage system, access for input/output operations to the data storage pool, the input/output operations being under control of the management module.

32. The storage system of claim 30, wherein processing the management information affects configuration of data on the first storage device.

33. The storage system of claim 30, wherein the first storage device is a physical storage device, and the management information relates to presenting, through an interface for access by external devices, a virtual disk that uses storage on the first storage device.

34. The storage system of claim 30, wherein processing the management information affects an input/output operation on the first storage device.

35. The storage system of claim 30, further comprising:
e) a replicate of the data storage pool management information, in tangible media, in a storage device other than the management device.

36. The storage system of claim 30, wherein the first storage device is a virtual storage device.

37. The storage system of claim 30, wherein the management storage device is a physical storage device.

38. The storage system of claim 37, further comprising:
e) files in the management storage device dedicated respectively to each controller, whereby the first controller exchanges management information pertaining to the storage pool with controllers in the set; and
f) logic, tangibly embodied in instructions stored in digital media, whereby the controllers exchange management information using the management storage device.

39. The storage system of claim 30, further comprising:
e) logic, tangibly embodied in instructions stored in digital media, whereby a controller in the set writes, to the management storage device, management information pertaining to the second storage device, and the first controller reads, and processes the management information written by the controller in the set.

40. A method for coordinating control of a storage system, which includes a data storage pool that contains a first storage device and a second storage device, a management module that contains a first controller and a set of one or more other controllers, and a management storage device that includes data storage pool management information represented in tangible media, the method comprising:
a) writing, to the management storage device by the first controller, management information pertaining to the first storage device;
b) reading, by each controller in the set, the management information written by the first controller; and
c) processing, by each controller in the set, the management information written by the first controller.

41. The method of claim 40, further comprising:
d) receiving by the management module requests from a plurality of devices for input/output operations that access the first storage device.

42. The method of claim 40, wherein the information written by the first controller pertains to the first storage device, and processing by a controller in the set affects the first storage device.

43. The method of claim 40, wherein the processing affects configuration of data on the first storage device.

44. The method of claim 40, wherein the first storage device is a physical storage device, and the processing affects a virtual representation of storage, the virtual representation involving storage on the first storage device.

45. The method of claim 40, wherein the processing affects an input/output operation on the first storage device.

46. The method of claim 40, further comprising:
d) replicating the data storage pool management information, in tangible media, in a storage device other than the management storage device.

47. The method of claim 40, further comprising:
d) mapping, by the management module, storage on the first storage device to a virtual storage device; and
e) making the virtual storage device available for access by devices external to the storage system.

48. The method of claim 47, further comprising:
f) modifying, by the first controller, the mapping of storage on the first storage device, the management information pertaining to the mapping modification.

49. The method of claim 47, further comprising:
f) modifying, by a controller in the set, mapping of storage on the first storage device, the management information pertaining to the mapping.

50. The method of claim 40, wherein the set contains at least two controllers.

51. The method of claim 40, further comprising:
f) writing, to the management storage device by a controller in the set, management information pertaining to the second storage device;
g) reading, by the first controller, the management information written by controller in the set; and
h) processing, by the first controller, the management information written by controller in the set.

* * * * *

UNITED STATES PATENT AND TRADEMARK OFFICE
CERTIFICATE OF CORRECTION

PATENT NO. : 7,702,757 B2
APPLICATION NO. : 10/819695
DATED : April 20, 2010
INVENTOR(S) : Bergman et al.

It is certified that error appears in the above-identified patent and that said Letters Patent is hereby corrected as shown below:

Title page under item (56),
List of References cited by applicant and considered by examiner,
Delete "trashing" and and insert --thrashing--

On Page 2 of 2 under item (56),
List of References cited by applicant and considered by examiner,
Delete "Configuraitons" and insert --Configurations--

Col. 12, line 27,
Claim 49, before "mapping" insert --the--

Signed and Sealed this
Eleventh Day of January, 2011

David J. Kappos
*Director of the United States Patent and Trademark Office*